C. R. DODGE.
COMBINED TAG AFFIXING AND MARKING MACHINE.
APPLICATION FILED OCT. 14, 1913.

Patented Aug. 25, 1914.
6 SHEETS—SHEET 1.

Witnesses

Inventor
Claude R. Dodge.
By Victor J. Evans
Attorney

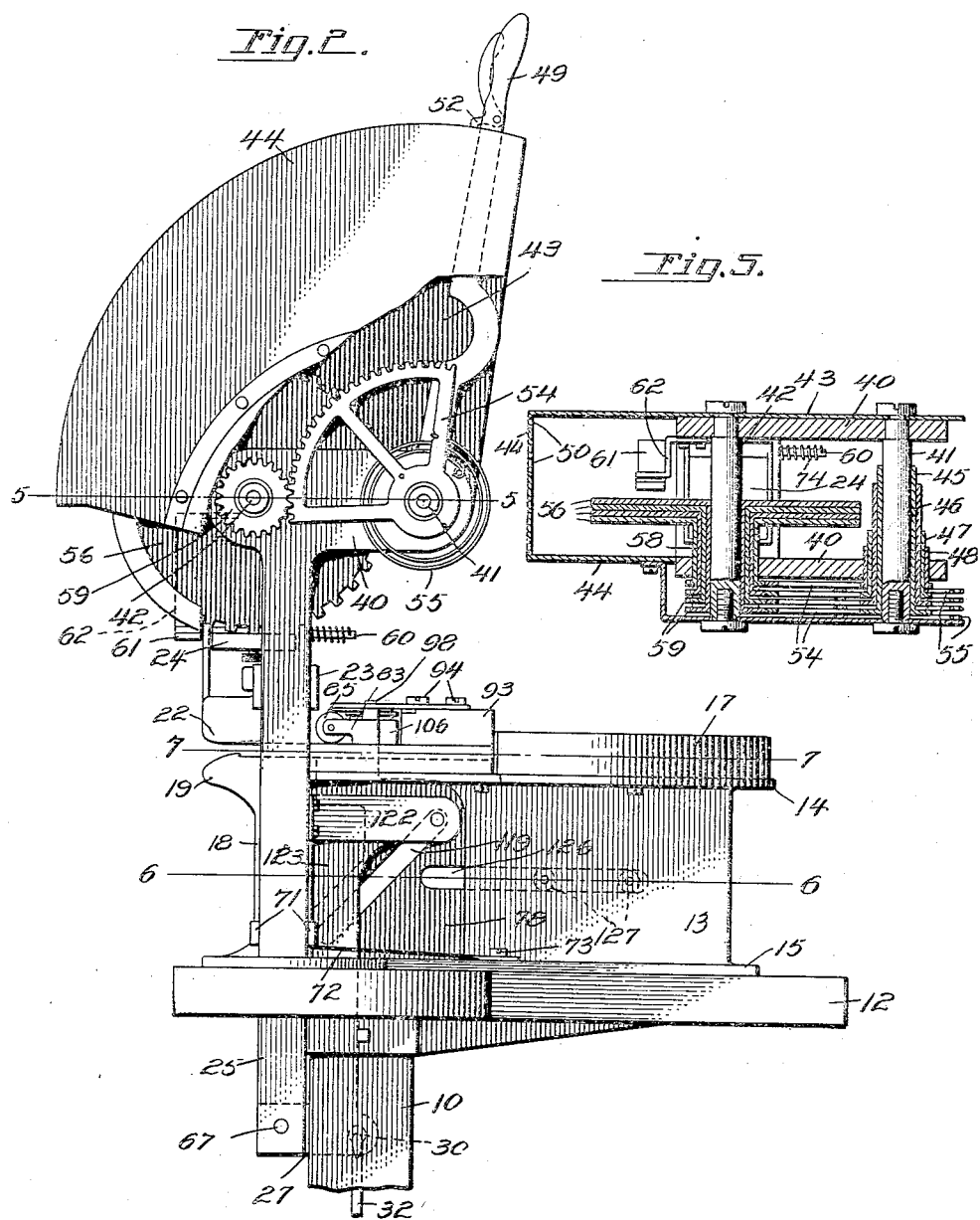

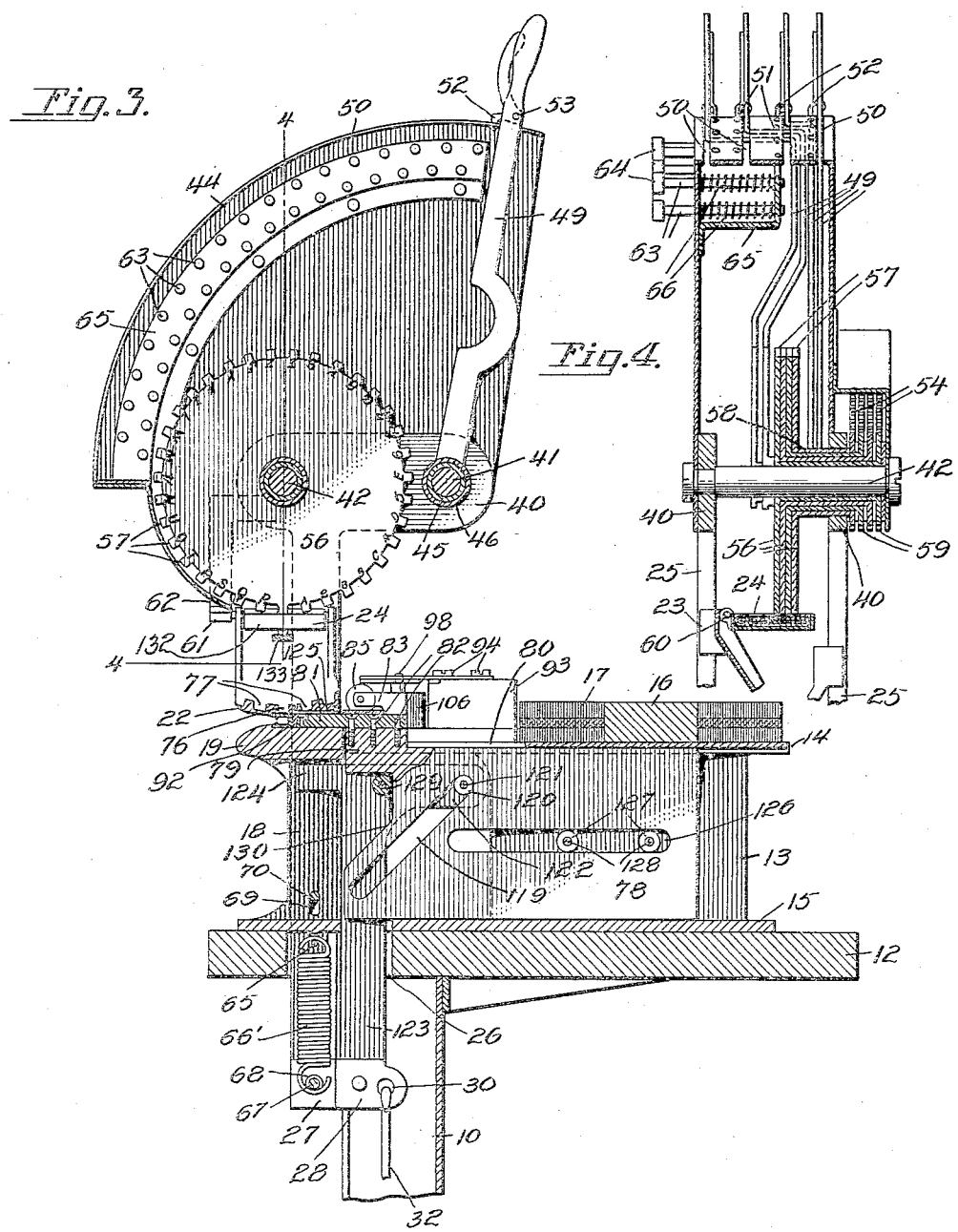

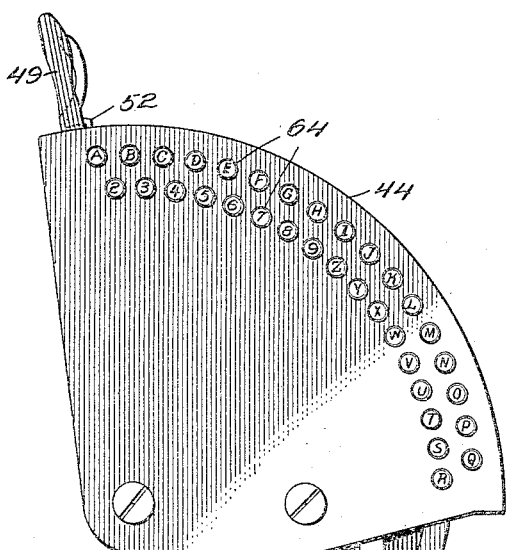
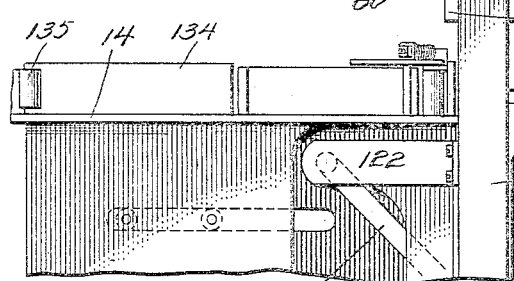
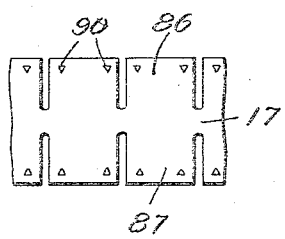
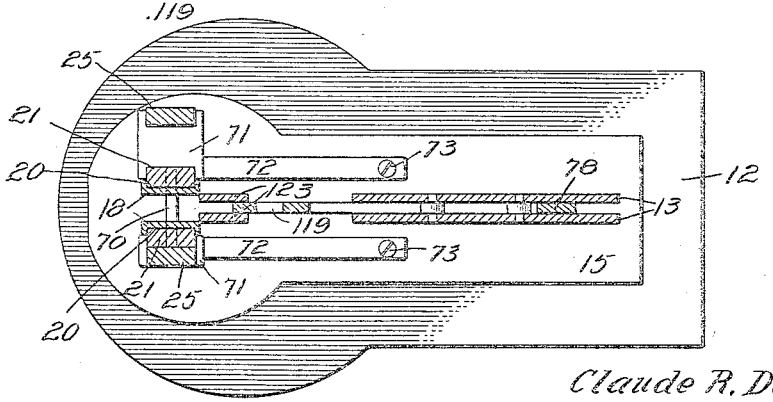

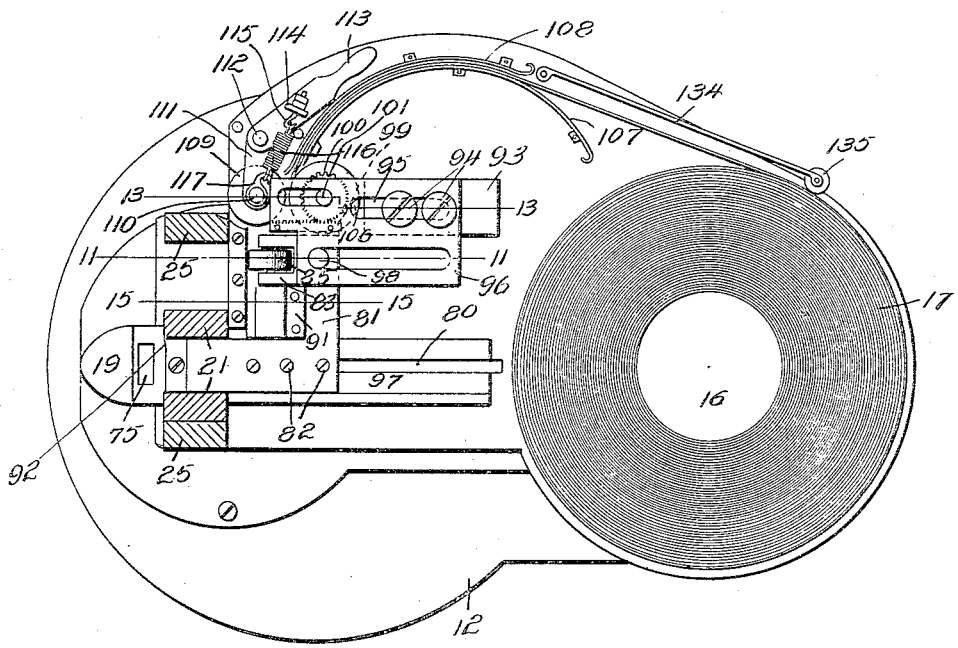

Figure 1:
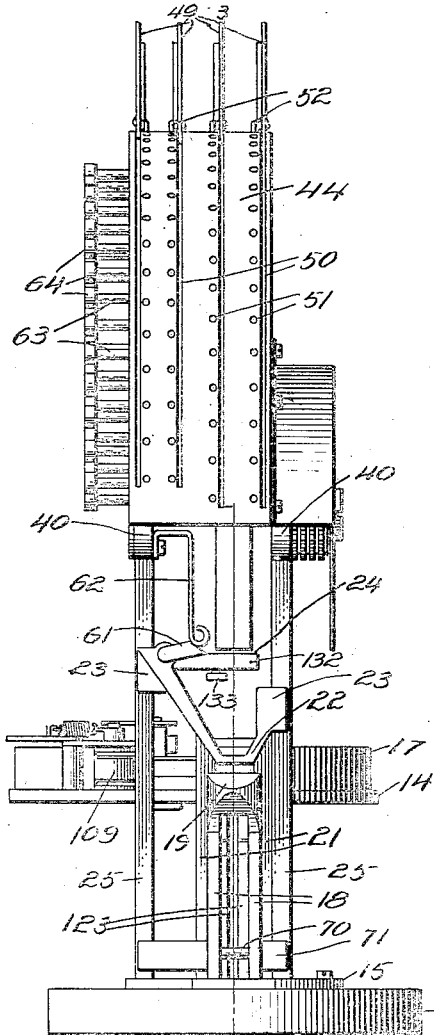

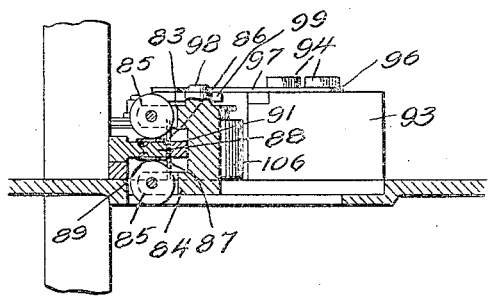
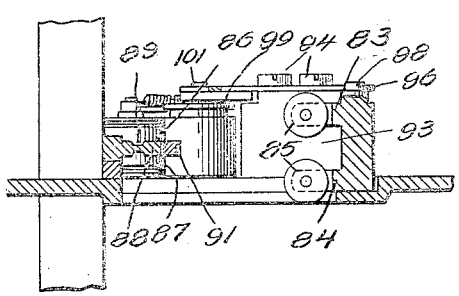
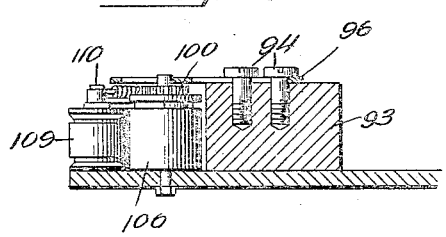
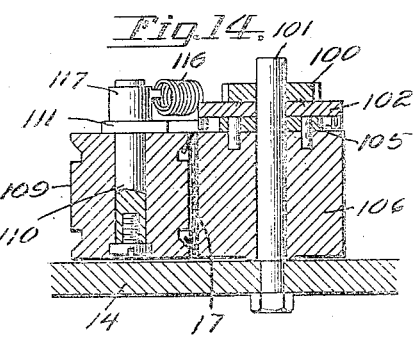
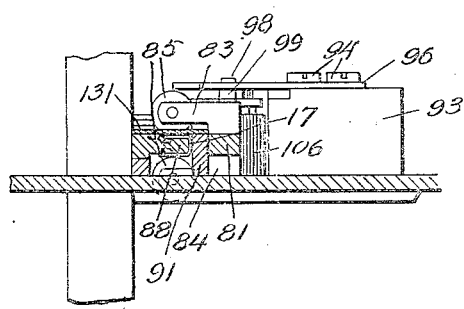
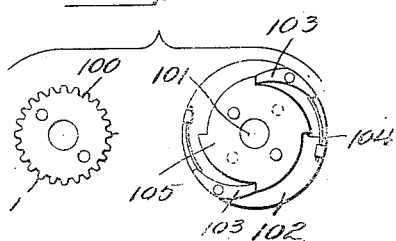

ial view on the line 9—9 of Fig. 1. Fig. 10 is a detail perspective view of the actuating plate for the feed roller, looking toward the under or lower side thereof. Fig. 11 is a sectional view on the line 11—11.of Fig. 7. Fig. 12 is a view similar to Fig. 11, showing the parts thereof in a shifted position. Fig. 13 is a sectional view on the line 13—13 of Fig. 7. Fig. 14 is an enlarged vertical sectional view through the guide and feed rollers of the tag mechanism, the same being on an enlarged scale. Fig. 15 is a sectional view on the line 15—15 of Fig. 7. Fig. 16 is a detail of the rack gear and ratchet mechanism for controlling the feed roller of the feed mechanism. Fig. 17 is a fragmentary front elevation of the machine. Fig. 18 is a fragmentary plan view of the tag tape.

UNITED STATES PATENT OFFICE.

CLAUDE R. DODGE, OF ST. GEORGE, UTAH.

COMBINED TAG AFFIXING AND MARKING MACHINE.

1,108,837.   Specification of Letters Patent.   Patented Aug. 25, 1914.

Application filed October 14, 1913. Serial No. 795,158.

*To all whom it may concern:*

Be it known that I, CLAUDE R. DODGE, a citizen of the United States, residing at St. George, in the county of Washington and State of Utah, have invented new and useful Improvements in Combined Tag Affixing and Marking Machines, of which the following is a specification.

The invention relates to laundry marking machines, and more particularly to the class of combined tag affixing and marking machines, which is especially designed for bending, marking and clamping metallic tags upon articles to be laundried, the tags being in tape form and form the subject-matter of my co-pending application, Serial No. 716,694, and filed August 23, 1912.

The primary object of the invention is the provision of a machine wherein tags will be successively folded into substantially U-shape, severed from the tape, and clamped upon articles to be laundried for affixing the same thereto, and furthermore the machine is adapted to print or mark the tags with identifying characters simultaneously with the affixing of such tags to the articles.

Another object of the invention is the provision of a machine of this character wherein laundry tags in tape form will be automatically fed and affixed to the articles to be laundried, and identifying characters printed or marked upon the tag simultaneously with the affixing thereof to such articles, or the identifying characters may be printed or marked directly upon the articles to be laundried, thereby dispensing with the use of the tag, the feeding and affixing mechanism for the latter being thrown out of operation under such conditions of use of the machine.

A further object of the invention is the provision of a machine of this character which may be used without the tag affixing mechanism, which is readily and easily thrown out of operation for a predetermined period so that the marking mechanism may be used in a separate operation or independently thereof, thus enabling a bundle of articles to be laundried to be marked by identifying characters printed on each article itself, or when necessary the tag feeding mechanism can be thrown in for simultaneous operation with the marking mechanism so that the tag can be affixed and the same printed or marked with identifying characters set for the marking of the article itself, thereby obviating the necessity of resetting the printing mechanism when desiring to affix tags to certain articles and applying identifying characters thereto and also the latter directly to certain articles other than those tagged in a single operation of the machine.

A further object of the invention is the provision of a machine of this character which is automatic in its action and embodies the desired features of simplicity, durability and efficiency, and by means of which the tags may be affixed and the articles marked successively, rapidly, conveniently and systematically without necessitating various adjustments and the changing of the position of a great number of parts of the machine.

With these and other objects in view, the invention consists in the construction, combination and arrangement of parts as will be hereinafter fully described, illustrated in the accompanying drawing, and pointed out in the claims hereunto appended.

Figure 2:
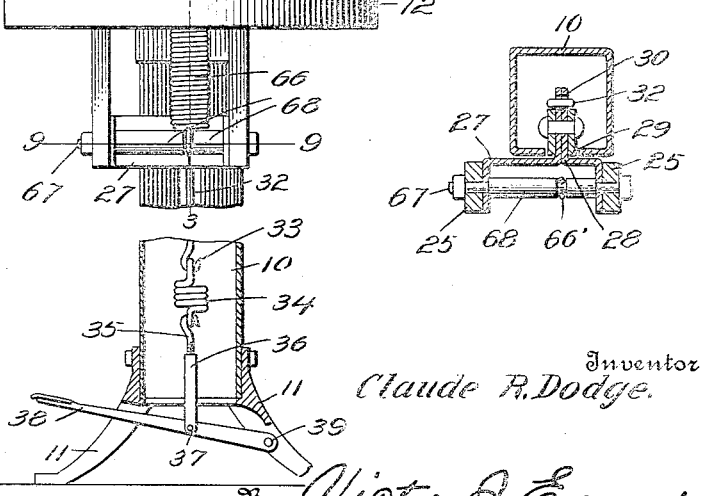

In the drawings:—Figure 1 is a side elevation of a machine constructed in accordance with the invention. Fig. 2 is a fragmentary rear elevation thereof, the same being partly broken away. Fig. 3 is a fragmentary vertical longitudinal sectional view on the line 3—3 of Fig. 1. Fig. 4 is a sectional view on the line 4—4 of Fig. 3. Fig. 5 is a sectional view on the line 5—5 of Fig. 2. Fig. 6 is a sectional view on the line 6—6 of Fig. 2. Fig. 7 is a sectional view on the line 7—7 of Fig. 2. Fig. 8 is a fragmentary view similar to Fig. 7 showing certain parts thereof in shifted position. Fig. 9 is a sect Similar reference characters indicate corresponding parts throughout the several views of the drawing.

Referring to the drawings in detail, the machine comprises in general tag affixing and marking mechanisms which coöperate with each other, the same being hereinafter more fully described.

With reference to the drawings by numerals, 10 designates a hollow or tubiform upright or post to which is fixed at its lower end supporting legs 11 for sustaining it vertical or in a perpendicular position, while suitably mounted upon or fixed to the upper end of the said upright or standard 10 is a horizontally disposed supporting or base plate 12 carrying the tag affixing and marking mechanisms hereinafter fully described.

Superimposed upon and permanently held fast upon the supporting or base plate 12 is a guide frame which is of substantially rectangular shape and includes spaced vertically disposed parallel side cheeks 13, top and bottom plates 14 and 15 respectively. Mounted upon the top plate 14 of the frame is a suitable spool 16 about which is normally wound the tag tape 17 adapted to be fed therefrom by means of the tag feeding mechanism hereinafter fully described.

At the front end of the frame, and rising from the bottom plate 15 thereof are the vertical supports 18 of an anvil 19, which is joined with the top plate 14 of the said frame and projects slightly above the upper face thereof, the outer sides of the supports 18 of the anvil 19 being formed with guideways 20 in which slide the vertical depending limbs 21 of a substantially V-shaped clamping jaw 22 which is formed with terminal guides 23 on one of which is swingingly connected an inking pad 24 for the marking mechanism presently described.

The tag marking mechanism comprises a two-part plunger including spaced vertically arranged parallel bars 25, the same being disposed at opposite sides of the depending limbs 21 of the movable clamping jaw 22, and work through a suitable guideway 26 formed in the supporting or base plate 12, and have bolted or otherwise secured between their lower ends a yoke 72, the same being formed with a contracted medial portion 28 which projects through an elongated slot 29 formed in the standard or upright 10 to extend within the latter, the contracted portion being formed with an eye 30 with which engages the upper hook end 31 of a pull rod 32, the lower hook end 33 of which engages a coiled retractile or tensioning spring 34 which also engages with an adjustable hook member 35 mounted in a link 36 pivoted at 37 to a foot lever 38 which is pivoted at 39 beneath the standard or upright 10 to one leg 11 supporting the same. The upper ends of the bars 25 are formed with horizontal portions 40 through which extend spaced horizontally disposed pintles or journals 41 and 42 respectively, the outer ends of which are secured in the side walls 43 of a substantially segmental-shaped housing 44 which incloses the printing disk and operating mechanism therefor hereinafter described.

Loosely surrounding the pintle or journal 41 and passed through one of the horizontal portions 40 of the plunger is a series of interfitting sleeves 45, 46, 47 and 48 respectively, each of which is connected with a hand throw lever 49 which extends upwardly in the housing 44 and projects exteriorly therefrom through a guide slot 50 formed in the curved or peripheral wall of the said housing, there being a like number of slots corresponding to the number of levers 49, and these slots are arranged in parallelism with respect to each other at spaced intervals in the periphery of the said housing. Contiguous to one longitudinal edge of each slot 50 and formed in the periphery of the housing 44 are spaced apertures 51 in any one of which engages a locking dog 52 pivoted at 53 to the handle end of the lever 49 so that the said lever can be locked in adjusted position. These sleeves each carries a toothed segment 54 which is suitably fixed thereto and is engaged by a coiled tension spring 55 which is also connected to the horizontal portion 40 of the plunger so as to automatically shift the lever 49 to normal position after being released by the locking dog 52 carried thereby. Loosely surrounding the pintle or journal 42 within the housing 44 is a series of printing disks or wheels 56, in this instance there being four in number, although a greater or less number may be employed. At the periphery of each wheel or disk 56 are formed type faces 57 presenting the letters of the alphabet, and also numerals ranging from 2 to 9 consecutively, these numerals being disposed alternately relative to the letters of the alphabet.

The letters of the alphabet and the numerals on the respective wheels or disks 56 are arranged correspondingly with respect to each other so that on the adjustment of the wheels or disks 56 like numerals or letters can be presented in alinement with each other for the stamping or printing thereof upon an article to be laundried or printed or marked upon a tag adapted to be applied to an article for identification purpose. The respective disks or wheels 56 are formed with interfitting sleeves 58 which are arranged concentrally about the pintle 42 and are free to rotate independently of each other, each sleeve being formed with a pinion 59 meshing with the segment 54 in alinement therewith. It will be apparent that when the lever 49 is moved in one direction the segment 54 will be rotated, thereby imparting a corresponding movement to its respective pinion 59, thus turning the printing disk or wheel 56 so as to bring either one of the letters of the alphabet or one of the numerals into proper position for the stamping or marking of a tag or an article to be laundried, which is introduced into the machine in a manner presently described. The inking pad 24 for applying ink to the type faces 57 is normally disposed in the path of vertical movement of the marking mechanism, said pad being supported upon a pivot 60 mounted in one end of the movable jaw 22, the guide terminals 23 of the latter being slidably engaged with the bars 25 of the plunger supporting the marking mechanism. The pivot 60 for the said pad 24 is formed with a trip arm 61 which projects into the path of a resilient tripping finger 62 which is fixed to one horizontal portion 40 of the said plunger so that on the lowering of the marking mechanism the finger 62 will act upon the trip lever 61, thereby swinging the pad 24 out of the path of the printing wheels or disks 56 so that the latter will be brought into position for marking a tag or article to be laundried.

In one side wall 43 of the housing 44 for the marking mechanism are mounted a plurality of push pins 63, the same being formed with button-like heads 64 on which are impressed or otherwise provided the letters of the alphabet and the numerals corresponding to those of the type faces 57 on the printing wheels or disks 56, the pins 63 being slidable through the housing and a guide strip 65 fixed interiorly of the said housing, the inner end portions of the pins 63 being surrounded by means of coiled compression springs 66 which are arranged between the strip 65 and the side wall adjacent thereto of the housing and are adapted to act upon the pins 63 to normally hold their inner ends out of the path of movement of the levers 49, yet on applying pressure inwardly upon the heads 64 of the pins the latter will be moved to bring their inner ends into the path of movement of the levers 49 to limit the throw thereof when manually manipulated so as to properly adjust the printing wheels or disks 56 to bring the desired type face 57 into position for the marking or printing of a tag or article.

Formed on the bottom plate 15 of the frame near the front end thereof is an eye 65 to which is connected one end of a coiled retractile spring 66', the same being also connected to the bolt 67 securing the yoke 27 to the bars 25 of the plunger for the marking mechanism. Surrounding the said bolt 67 on opposite sides of the point of connection of the spring 66' therewith are spacing sleeves 68 which work against the ends of the yoke 27 and are designed to prevent the displacement of the connecting end of the spring 66' upon the said bolt. The spring 66' supports the frame to which the printing mechanism is attached.

Formed in each of the supports 18 of the anvil 19 is a slot 69 forming a guideway through which is passed a pin 70, the same being fixed in the depending limbs 21 of the movable jaw 22, and this pin 70 is adapted to limit the upward and downward movement of the said jaw when the foot treadle 38 is being depressed or released. Fixed to the limbs 21 of the jaw 23 slightly above the base 12 are lateral guide blocks 71, the same being designed to slidably engage the bars 25 of the plunger for the marking mechanism, and working against these blocks 71 are the free ends of leaf springs 72 which are fixed at 73 near their opposite ends to the bottom plate 15 of the frame, the said springs 72 being designed to lift the jaw 23 and support the same away from the anvil 19 on releasing the foot treadle 38, and after the latter has been depressed for the clamping of a tag to an article.

Surrounding the pivot 60 swingingly connecting the inking pad 24 to one free end of the jaw 22 is a coiled tension spring 74 which is designed to act upon the inking pad 24 to normally hold it in the path of movement of the printing disks or wheels 56 so that the said pad will contact with the type faces 57 on the wheels for the inking thereof prior to the impression stroke of the marking mechanism.

The anvil has mounted thereon a bed plate 75 which is arranged to aline with one of the type faces 57 when brought into position for marking a tag or article. The jaw 22 is formed with an impression opening 76 through projects the type face 57 when in position for marking a tag or article, while at opposite sides of this opening 76 and formed in the inner surface of the jaw are recesses 77 which accommodate the type faces 57 adjacent to and at opposite sides of that type surface positioned for marking the tag or article so that a single character will be marked thereon, the recesses 77 being disposed in an arc corresponding to the arc of the periphery of the printing wheels or disks 56.

The tag feeding mechanism comprises a slide 78 which is disposed between the cheeks 13 of the guide frame and is movable longitudinally therein, the forward end of the said plate being formed at its outer edge with a vertical web or lug 79 which projects through a slot 80 formed in the top plate 14 of the frame and has its top surface flush with the upper face of the anvil 19. Fixed to this web or lug 79 is a substantially L-shaped tag forming plate 81, one arm thereof being fastened to the web or lug 79 by means of screw members 82, while its opposite arm at the free end thereof is formed with bifurcated upper and lower spaced bearings 83 and 84 respectively in which are journaled tag folding or bending rollers 85, one of which engages the uppermost wing 86 of one tag of the tape 17, while the other roller engages the lower wing 87 of the said tag when the latter is positioned directly in the path of movement of the said rollers 85 so as to act upon the tag and bend the same about a stationary tag former bar or plate 88 fixed to the top plate 14 of the frame, the bar or plate 88 being formed in its upper and lower faces with channels or grooves 89 for accommodating the bendable spurs 90 cut from the wings 86 and 87 of the tag so as not to straighten the said spurs 90 during the bending of the wings of the tag for forming the latter into substantially U-shape. Mounted upon the top plate 14 of the frame, contiguous to and parallel with the stationary tag former bar or plate 88 is a guide bar 91 which serves to hold the tag tape when fed between the said bar 91 and the bar or plate 88 against the latter for the proper bending of the wings 86 and 87 of each tag by the rollers 85 when the tag forming plate 81 is advanced toward the tag. The bar 91 is of substantially the same length as the bar or plate 88 so that the tag after being folded will be fed beyond the same into the path of movement of a cutter 92 which is fastened to the arm of the plate 81 secured to the web or lug 79 of the slide 78 whereby on the contact of the cutter 92 with the folded tag it will be severed from the tape 17 during the operation of the machine. The plate 81 after severing the tag from the tape 17 advances it on to the anvil 19 to be acted upon by the jaw 22 for the clamping of the said tag to an article to be laundried and for the subsequent marking of the tag by the marking mechanism for identification purpose.

At one side of the tag forming plate 81 and fixed to the top plate 14 of the frame is a supporting block 93 in which are engaged a pair of guide screws 94, the same being passed through a guide slot 95 formed in a feed plate 96 superimposed and slidable upon the said block 93. This plate 96 is formed with a slot 97 into which projects a pin or lug 98 formed on and rising from the tag forming plate 81 directly rearwardly of the rollers 85 so that when the said plate 81 is moved a predetermined distance the feed plate 96 will synchronously move therewith, which plate 96 carries a toothed rack 99 secured to its under face, and meshes with a pinion 100 loosely journaled upon a stud pintle 101 fixed in and rising from the top plate 14 of the frame. The pinion 100 is pinned or otherwise secured to a disk 102 disposed immediately below the same and is provided with pivoted spring held ratchet dogs or pawls 103 which engage the teeth 104 of a ratchet wheel 105 which is pinned or otherwise secured to a feed roller 106 loosely journaled upon the stud pintle 101, the feed roller 106 being designed for engagement with the tag tape 17 to advance the same through the machine into the path of the tag forming plate 81 so that the individual tags of the said tape will be successively operated upon for bending or folding the same into U-shape, and subsequently severed from the tape and clamped to an article to be laundried. The ratchet pawls or dogs 103 on movement of the tag forming plate 81 in one direction will engage the teeth 104 of the ratchet wheel 105 for locking the feed roller 106 with the pinion 100, which is actuated upon by the toothed rack 99 carried by the feed plate 96 which in its turn is moved by the tag forming plate 81, and in this manner the tag tape 17 will be fed for the successive bending of the tags thereof and the severing of the same therefrom. When the feed plate 96 moves in the reverse direction the ratchet wheels 103 ride over the teeth 104 of the ratchet wheel 105, thus preventing the reverse rotation of the feed roller 106 and thereby obviating the back feed of the tag tape 17 during the continued operation of the machine.

The feed roller 106 is disposed at one side of the tag tape 17, which travels between inner and outer guides 107 and 108 respectively, while at the opposite side of the tag tape in alinement with the feed roller 106 is a combined guide and tensioning roller 109 which is journaled upon a stud pintle 110 mounted in an arm 11 loosely connected to a stationary stud member 112 to which is loosely connected a shifting lever 113, the latter being formed with an eye 114 in which is adjustably engaged a hook 115 having connected thereto one end of a coiled retractile spring 116, the same being also engaged with a hook 117 carried on the stud pintle 110 so that when the lever is thrown in one direction the spring is shifted to one side of the center of axis of movement of the lever 113 for the tensioning of the roller against the tag tape 17, thus holding it in contact with the feed roller 106 so that the latter will advance the tag tape into the tag forming mechanism of the machine. On shifting the lever in the reverse direction the spring 116 is thrown to the opposite side of the axis of movement of the lever, thereby throwing the guide and tensioning roller 109 away from the tag tape 17 so that the feed roller 106 will become inoperative for advancing the tag tape into the machine to be operated upon by the tag forming mechanism thereof. The guide and tensioning roller 109 is formed in its periphery with upper and lower grooves 118 which aline with the spurs 90 formed in the wings 86 and 87 of the tags and are out-struck therefrom so as to prevent the blunting or straightening of the said spurs 90 when the roller 109 contacts with the tape to hold the same against the feed roller 106 during the feeding of the tape to the machine, the spurs being out-struck from the wings 86 and 87 of each tag.

The slide 78 near its forward end is formed with a diagonal slot 119 forming a cam guideway in which works a roller 120 journaled upon a pintle 121 mounted in the wings 122 disposed on opposite sides of the slide 78 mounted upon the depending bars 25 of the two part plunger. A plunger 123 rises from and is fixed to the contracted portion 28 of the yoke 27, and is adapted to work through the guideway 26 in the base plate 12, and has at its upper end a forwardly projecting nose 124 which works against the pin 70 carried by the limbs 21 of the movable jaw 22 so that on the lowering of the plunger 123 simultaneously with the plunger supporting the marking mechanism the jaw will be moved into clamping relation to the anvil 19 for the clamping of the tag to an article which is inserted between the said anvil 19 and the jaw after the tag has been positioned thereon subsequent to the folding and severing of the same from the tape. Above the anvil 19 is supported a keeper 125 which drops behind the tag after being positioned over the bed plate 75 on the anvil 19 so as to prevent the rearward displacement of the tag on the anvil when the article is inserted between the wings of the said tag for the clamping of the latter thereto, or during the interval of marking the tag the keeper 125 is lifted out of the path of movement of the tag when being advanced on to the anvil 19 under the action of the cutter 92 carried by the tag forming plate 81, the said tag when severed abutting against the cutter 92 and is advanced on to the anvil during the forward movement of the tag forming plate 81 which is shifted forwardly when the plunger 123 is returned to normal position by the spring 66' after depressing the foot treadle 38, the roller 120 being disposed between the wings 122 and operates in the cam slot 119 to reciprocate the slide 78 in the frame between its cheeks 13, and this slide operates the tag forming plate 81. Also formed in the slide 78 is a horizontal slot 126 in which work guide rollers 127 journaled upon stud pintles 128 fixed in the side cheeks 13 of the frame, the rollers 127 guiding the slide 78 during its movement longitudinally within the frame.

The nose 124 works between the vertical supports 18 of the anvil 19, and carried upon the plunger 123 on which the nose 124 is formed is a spacer sleeve 129 for separating the two parts of the said plunger, the slides 78 being cut away to form a notch 130 in its front end so that the sleeve 129 will not be interfered with in its reciprocating movement within the frame when the machine is actuated.

Mounted upon the guide bar 91 is a guide plate 131 beneath which moves the folded tags of the tape to retain the same in their bent or folded form after being acted upon by the tag forming mechanism of the machine.

It will be apparent that the inking pad 24 is normally held in contact with the type on the printing disks or wheels, and thus the type which is to print is inked just prior to printing. On the lowering of the printing disks or wheels the inking pad 24 is automatically shifted out of the path thereof by the tripping fingers 62, which act upon the trip lever 61 when the plunger supporting the marking mechanism is being lowered prior to the lowering of the clamping jaw 22 which is actuated through the nose 124 on the plunger 123, the said nose being engageable with the pin 70 connected to the limbs 21 of the jaw 22 when the nose contacts with the said pin on depressing the foot treadle 38 by the foot of the operator of the machine.

The inking pad 24 is detachable from a holder 132, and said pad is fastened therein through the medium of a set screw 133 mounted in the holder 132. The removal of the pad will permit the supplying of ink thereto should the same become dry.

To obviate the excessive or rapid advancement of the tag tape 17 from the reel 16 during the feeding of the same to the machine there is provided a tensioning device comprising a resilient arm 134 which is suitably mounted upon the top plate 14 of the frame and carries at its free end a roller 135 which contacts with the tag tape when wound upon the reel, thus holding it taut, and preventing the free unwinding of the same therefrom while the machine is in operation.

From the foregoing description, taken in connection of the accompanying drawings, the construction and the manner of employing the invention will be readily apparent. Assuming that it is desired to attach a tag to an article to be laundered and to mark such tag, the printing disks or wheels 56 having been properly set as heretofore described by manipulating the pins 63 and levers 49, the article is placed in position between the sides of a tag which is on the anvil 19 of the machine as shown in Fig. 3 of the drawings. The foot treadle 38 is then depressed and the plunger supporting the printing or marking mechanism is pulled downward, and simultaneously with the movement of the said plunger the plunger 123 is lowered, and in this manner the clamping jaw 22 is lowered to operate upon the tag for the clamping of the same to the article. The tag is thus flattened, presenting a good printing surface, and the plunger supporting the marking mechanism continuing to move downward prints the selected mark on the tag, the inking pad being previously moved out of the path of the printing disks or wheels as heretofore described. When the clamping and the printing of the tag takes place the slide 78 has been moved rearwardly within the frame so that the tag forming mechanism will be in retracted position behind the next tag to be fed to the anvil. As the tag bending mechanism with its arm 81 moves backward away from the anvil the pin 98 thereon slides within the slot 97 in the plate 96, (see Fig. 10), until the knife edge of the tag severer is out of the path of the tags to be fed into position to be cut off and delivered to the anvil at this point. The pin 98 on the arm 81 contacts with the plate 96 at the end of the slot 97 and moves said plate backward just far enough to feed a tag into position to be severed and fed to the anvil on the forward movement of the cutter and bender, so it will be apparent that the tag feeding mechanism is in action during the backward movement of the tag bending mechanism, and that the tag is bent as the cutter carries the previously bent tag to the anvil and as the bending mechanism moves to normal position, the tag to be bent is acted upon by the bending mechanism so that said tag is bent about the tag former bar or plate 88 into substantially U-shape. When the printing disks or wheels and the clamping jaw are elevated under the action of the spring 72 when relieving pressure upon the foot treadle 38, the slide 78 is moved forwardly within the frame, thereby advancing the tag forming plate 81 so that the rollers 85 will engage the wings of a tag for the bending of the same about the tag former or plate 88. The advancement of the tag forming plate 81 causes slight movement of the feed plate 98 which carries the toothed rack 99 meshing with the pinion 100, and as the latter rotates the ratchet pawls 103 ride over the teeth 104 of the ratchet wheel 105 so as to prevent the rotation of the feed roller 106 which is adapted to feed the tape 17 in a step by step manner subsequent to the bending successively of the tags on the advancement of the tag forming plate 81 in its initial forward movement. When the tape 17 has been advanced by the feed roller 106 the tags thus formed prior to the feeding of the tape will be successively brought into the path of the cutter 92 to sever the folded tag from the tape and the positioning of the latter on the anvil to be acted upon by the clamping jaws for the clamping of a tag to an article. Should it be desired to mark the article itself without the use of a tag, the operator throws the lever 113 in a direction to retract the guide and tension roller 109 from the tape 17 so that the feed roller 106 will not advance or feed the tape 17 into the machine to be operated upon by the tag forming mechanism. The article to be marked is placed upon the anvil, it being understood of course that the printing disks or wheels are adjusted for the printing of letters or the combination of a letter and number or letters and numbers, and on depressing the foot treadle 38 the article will be marked by the printing disks or wheels.

It will be seen that the invention provides a simple, economical form of machine by means of which the laundry may be simultaneously tagged and marked or marked without tagging as desired. Furthermore by employing but four characters to make up the mark it enables the employment of a relatively small tag or tags or to print the mark in a relatively small space upon the goods so that the latter will not be disfigured in any manner. It is of course to be understood that the characters may be increased or decreased if desired, and by employing other printing disks bearing other series of marks the marking of the tags or the goods can be varied and the capacity of the machine may be increased or decreased if the occasion demands.

While there is herein shown and described one particular embodiment of the invention by way of illustration, it is to be understood that the invention is not limited to all of the precise details of construction set forth, as modifications and variations may be made without departing from the spirit of the invention or exceeding the scope of the claims.

What is claimed is:—

1. In a machine of the class described, the combination with a support for the tag, of a tag feeding mechanism, a movable tag clamping mechanism, printing mechanism movable toward and away from the said support, tag bending mechanism operative upon the tag feeding mechanism, means cooperative with the tag bending mechanism for severing a tag subsequent to the bending thereof, and mechanism common to the tag bending mechanism, printing mechanism and the clamping mechanism for simultaneously imparting motion to the same for the successive operation thereof.

2. In a machine of the class described, the combination with a support for the tag, of a tag feeding mechanism, a movable tag clamping mechanism, printing mechanism movable toward and away from the said support, tag bending mechanism operative upon the tag feeding mechanism, means cooperative with the tag bending mechanism for severing a tag subsequent to the bending thereof, mechanism common to the tag bending mechanism, printing mechanism and the clamping mechanism for simultaneously imparting motion to the same for the successive operation thereof, and means for guiding the tags to the feeding mechanism.

3. In a machine of the class described, the combination with a support for the tag, of a tag feeding mechanism, a movable tag clamping mechanism, printing mechanism movable toward and away from the said support, tag bending mechanism operative upon the tag feeding mechanism, means coöperative with the tag bending mechanism for severing a tag subsequent to the bending thereof, mechanism common to the tag bending mechanism, printing mechanism and the clamping mechanism for simultaneously imparting motion to the same for the successive operation thereof, means for guiding the tags to the feeding mechanism, and means for freeing the tag feeding mechanism on the forward movement of the tag bending mechanism.

4. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, and mechanism successively operated for first clamping a tag to an article and subsequently marking the same.

5. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, mechanism successively operated for first clamping a tag to an article and subsequently marking the same, and mechanism for successively operating the tag feeding mechanism, clamping mechanism and marking mechanism.

6. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, mechanism successively operated for first clamping a tag to an article and subsequently marking the same, mechanism for successively operating the tag feeding mechanism, clamping mechanism and marking mechanism, and manually operable mechanism for bringing the tags into operative or inoperative relation to the tag feeding mechanism.

7. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, mechanism successively operated for first clamping a tag to an article and subsequently marking the same, mechanism for successively operating the tag feeding mechanism, clamping mechanism and marking mechanism, manually operable mechanism for bringing the tags into operative or inoperative relation to the tag feeding mechanism, and means for holding the tag against displacement on the support on the retracting of the tag bending mechanism prior to the clamping and marking of the tag.

8. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, mechanism successively operated for first clamping a tag to an article and subsequently marking the same, mechanism for successively operating the tag feeding mechanism, clamping mechanism and marking mechanism, manually operable mechanism for bringing the tags into operative or inoperative relation to the tag feeding mechanism, means for holding the tag against displacement on the support on the retracting of the tag bending mechanism prior to the clamping and marking of the tag, and means for guiding the tag to the tag feeding mechanism.

9. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, mechanism successively operated for first clamping a tag to an article and subsequently marking the same, mechanism for successively operating the tag feeding mechanism, clamping mechanism and marking mechanism, manually operable mechanism for bringing the tags into operative or inoperative relation to the tag feeding mechanism, means for holding the tag against displacement on the support on the retracting of the tag bending mechanism prior to the clamping and marking of the tag, means for guiding the tag to the tag feeding mechanism, and means for guiding the tags across the path of movement of the tag bending and cutting mechanism.

10. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, mechanism successively operated for first clamping a tag to an article and subsequently marking the same, mechanism for successively operating the tag feeding mechanism, clamping mechanism and marking mechanism, manually operable mechanism for bringing the tags into operative or inoperative relation to the tag feeding mechanism, means for holding the tag against displacement on the support on the retracting of the tag bending mechanism prior to the clamping and marking of the tag, means for guiding the tag to the tag feeding mechanism, means for guiding the tags across the path of movement of the tag bending and cutting mechanism, and means for inking the marking elements of the marking mechanism and movable out of the path of the same when approaching the tag support.

11. In a machine of the class described, the combination with a support for the tags, of mechanism movable toward and away from the support for bending said tags, a cutter carried by said mechanism and adapted to sever the tags successively after the bending thereof, mechanism for feeding the tags into the path of the tag bending mechanism, mechanism successively operated for first clamping a tag to an article and subsequently marking the same, mechanism for successively operating the tag feeding mechanism, clamping mechanism and marking mechanism, manually operable mechanism for bringing the tags into operative or inoperative relation to the tag feeding mechanism, means for holding the tag against displacement on the support for the retracting of the tag bending mechanism prior to the clamping and marking of the tag, means for guiding the tag to the tag feeding mechanism, means for guiding the tags across the path of movement of the tag bending and cutting mechanism, means for inking the marking elements of the marking mechanism and movable out of the path of the same when approaching the tag support, and mechanism for setting the tag marking mechanism.

12. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, and mechanism for feeding the tape into the path of the severing means.

13. In a machine of the class described, the combination with tag affixing mechanism, of marking mechanism comprising a plurality of type wheels rotatably supported above the support for the tag, mechanism for adjusting the wheels independently of each other, means for locking the last named means in adjusted position, means for moving the said adjusting means to normal position upon releasing the same, means for supplying ink to the type wheels, means for severing tags singly from a tape, mechanism for feeding the tape into the path of the severing means, and means for operating the tag marking mechanism and the severing means.

14. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, and mechanism coöperative with the severing means for bending the tags prior to the severing of the same from the tape.

15. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, mechanism coöperative with the severing means for bending the tags prior to the severing of the same from the tape, and connections between the severing means and the feeding mechanism for controlling the latter.

16. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, mechanism coöperative with the severing means for bending the tags prior to the severing of the same from the tape, connections between the severing means and the feeding mechanism for controlling the latter, and means for rendering the feeding mechanism ineffective on the forward movement of the bending and severing means.

17. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, mechanism coöperative with the severing means for bending the tags prior to the severing of the same from the tape, connections between the severing means and the feeding mechanism for controlling the latter, means for rendering the feeding mechanism ineffective on the forward movement of the bending and severing means, and means for guiding the tape into the path of the bending and severing means.

18. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, mechanism coöperative with the severing means for bending the tags prior to the severing of the same from the tape, connections between the severing means and the feeding mechanism for controlling the latter, means for rendering the feeding mechanism ineffective on the forward movement of the bending and severing means, means for guiding the tape into the path of the bending and severing means, and means for automatically elevating the marking mechanism.

19. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, mechanism coöperative with the severing means for bending the tags prior to the severing of the same from the tape, connections between the severing means and the feeding mechanism for controlling the latter, means for rendering the feeding mechanism ineffective on the forward movement of the bending and severing means, means for guiding the tape into the path of the bending and severing means, means for automatically elevating the marking mechanism, and mechanism for clamping the tag to an article.

20. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, mechanism coöperative with the severing means for bending the tags prior to the severing of the same from the tape, connections between the severing means and the feeding mechanism for controlling the latter, means for rendering the feeding mechanism ineffective on the forward movement of the bending and severing means, means for guiding the tape into the path of the bending and cutting mechanism, means for automatically elevating the marking mechanism, mechanism for clamping the tag to an article, and means for supporting the tag after severing the same from the tape in the path of the clamping and marking mechanism.

21. In a machine of the class described, the combination with tag affixing mechanism, of marking mechanism comprising a plurality of type wheels rotatably supported above the support for the tag, mechanism for adjusting the wheels independently of each other, means for locking the last-named means in adjusted position, means for moving the said adjusting means to normal position upon releasing the same, means for supplying ink to the type wheels, means for severing tags singly from a tape, mechanism for feeding the tape into the path of the severing means, means for operating the tag marking mechanism and the severing means, mechanism coöperative with the severing means for bending the tags prior to the severing of the same from the tape, connections between the severing means and the feeding mechanism for controlling the latter, means for operating the feeding mechanism on the retracting of the bending and severing means, means for guiding the tape into the path of the bending and severing means, means for automatically elevating the marking mechanism, mechanism for clamping the tag to an article, means for supporting the tag after severing the same from the tape in the path of the clamping and marking mechanism, and means for preventing displacement of the tag on the supporting means when the tag severing means is being retracted.

22. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, and tag marking mechanism operative upon the tag subsequent to the clamping thereof to an article.

23. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, and mechanism for manually controlling the tag marking mechanism for setting the same.

24. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, mechanism for manually controlling the tag marking mechanism for setting the same, and manually operated means for controlling the feed of the tag tape.

25. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, and means operative by the tag bending mechanism for feeding the tape into the path thereof.

26. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tag bending mechanism for feeding the tape into the path thereof, and mechanism common to the tag clamping mechanism, the tag marking mechanism and the tag feeding mechanism for simultaneously operating the same.

27. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tag bending mechanism for feeding the tape into the path thereof, mechanism common to the tag clamping mechanism, the tag marking mechanism and the tag feeding mechanism for simultaneously operating the same, and guides for the tag tape directing it to the tag feeding mechanism.

28. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tag bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, and means for limiting the movement of the tag clamping mechanism.

29. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, and means for lifting the tag marking mechanism from the anvil subsequent to the action thereof on the tag.

30. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, and a foot operated treadle connected with the operating mechanism for actuating the same.

31. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, and inking means for the marking mechanism.

32. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, and means on the support for the marking mechanism and tripping the inking mechanism out of the path of the marking elements of the said marking mechanism when operating toward the anvil.

33. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, and means for normally holding the inking means in the path of the marking elements of the marking mechanism.

34. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, means for normally holding the inking means in the path of the marking elements of the marking mechanism, and a tag former arranged in the path of the tag bending mechanism for shaping the tag into substantially U-shape thereby.

35. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, means for normally holding the inking means in the path of the marking elements of the marking mechanism, a tag former arranged in the path of the tag bending mechanism for shaping the tag into substantially U-shape thereby, and manually operable mechanism for setting the tag marking elements of the tag marking mechanism.

36. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, means for normally holding the inking means in the path of the marking elements of the marking mechanism, a tag former arranged in the path of the tag bending mechanism for shaping the tag into substantially U-shape thereby, manually operable mechanism for setting the tag marking elements of the tag marking mechanism, and means for locking the manually controlled mechanism in adjusted position.

37. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, means for normally holding the inking means in the path of the marking elements of the marking mechanism, a tag former arranged in the path of the tag bending mechanism for shaping the tag into substantially U-shape thereby, manually operable mechanism for setting the tag marking elements of the tag marking mechanism, means for locking the manually controlled mechanism in adjusted position, and means acting on the manually controlled mechanism for bringing the same to normal position when released.

38. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag feeding mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, means for normally holding the inking means in the path of the marking elements of the marking mechanism, a tag former arranged in the path of the tag bending mechanism for shaping the tag into substantially U-shape thereby, manually operable mechanism for setting the tag marking elements of the tag marking mechanism, means for locking the manually controlled mechanism in adjusted position, means acting on the manually controlled mechanism for bringing the same to normal position when released, and means for holding the tag tape feeding mechanism passive on the forward movement of the tag bending mechanism to prevent the back feeding of the tag tape.

39. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag bending mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, means for normally holding the inking means in the path of the marking elements of the marking mechanism, a tag former arranged in the path of the tag bending mechanism for shaping the tag into substantially U-shape thereby, manually operable mechanism for setting the tag marking elements of the tag marking mechanism, means for locking the manually controlled mechanism in adjusted position, means acting on the manually controlled mechanism for bringing the same to normal position when released, means for holding the tag tape feeding mechanism passive on the forward movement of the tag bending mechanism to prevent the back feeding of the tag tape, and manually actuated means for throwing the tag tape into or out of operative relation to the tag feeding mechanism.

40. In a machine of the class described, the combination with an anvil, of means for supporting a tag tape, reciprocating mechanism for bending tags successively from the tape, means for feeding the tape into the path of the bending mechanism, a cutter carried by the bending mechanism for severing the tags successively subsequent to the bending thereof and also for supplying the tags to the anvil, means for clamping a tag to an article when positioned upon the anvil, tag marking mechanism operative upon the tag subsequent to the clamping thereof to an article, mechanism for manually controlling the tag marking mechanism for setting the same, manually operated means for controlling the feed of the tag tape, means operative by the tape bending mechanism for feeding the tape into the path thereof, mechanism common to the tag clamping mechanism, the tag marking mechanism and the tag bending mechanism for simultaneously operating the same, guides for the tag tape directing it to the tag feeding mechanism, means for limiting the movement of the tag clamping mechanism, means for lifting the tag marking mechanism from the anvil subsequent to the action thereof on the tag, a foot operated treadle connected with the operating mechanism for actuating the same, inking means for the marking mechanism, means on the support for the marking mechanism and tripping the inking mechanism out of the path of the marking elements of the said marking mechanism when operating toward the anvil, means for normally holding the inking means in the path of the marking elements of the marking mechanism, a tag former arranged in the path of the tag bending mechanism for shaping the tag into substantially U-shape thereby, manually operable mechanism for setting the tag marking elements of the tag marking mechanism, means for locking the manually controlled mechanism in adjusted position, means acting on the manually controlled mechanism for bringing the same to normal position when released, means for rendering the feeding mechanism ineffective on the forward movement of the tag bending mechanism to prevent the back feeding of the tag tape, manually actuated means for throwing the tag tape into or out of operative relation to the tag feeding mechanism, and means for holding each tag against displacement on the anvil when positioned thereon.

41. In a machine of the class described, the combination with an anvil, of means for supplying tags thereto, a movable support slidable with relation to said anvil, a clamping device movable toward and away from the anvil and adapted to clamp a tag to an article, printing mechanism comprising a plurality of printing wheels rotatably mounted in the said support, type carried by the wheels and bearing characters to compose a mark, means for rotating the wheels independently of each other for bringing predetermined type thereon into alinement with each other prior to the marking of the tag, means for supplying ink to the alining type and movable out of the path of the wheels when approaching the anvil, means for locking the means for moving the wheels in adjusted position to hold the wheels against rotation during the printing operation, means for moving the means for rotating the wheels to normal position when released, means for holding the tag against displacement on the anvil, mechanism common to the clamping and printing mechanism for simultaneously operating the same, and tag feeding, bending and cutting mechanism coöperative with each other and controlled by the said last-named mechanism.

42. In a machine of the class described, the combination with an anvil, of means for supplying tags thereto, a movable support slidable with relation to said anvil, a clamping device movable toward and away from the anvil and adapted to clamp a tag to an article, printing mechanism comprising a plurality of printing wheels rotatably mounted in the said support, type carried by the wheels and bearing characters to compose a mark, means for rotating the wheels independently of each other for bringing predetermined type thereon into alinement with each other prior to the marking of the tag, means for supplying ink to the alining type and movable out of the path of the wheels when approaching the anvil, means for locking the means for moving the wheels in adjusted position to hold the wheels against rotation during the printing operation, means for moving the means for rotating the wheels to normal position when released, means for holding the tag against displacement on the anvil, mechanism common to the clamping and printing mechanism for simultaneously operating the same, tag feeding, bending and cutting mechanism coöperative with each other and controlled by the said last-named mechanism, and means at one side of the tag feeding mechanism for guiding a tag tape into the path of movement of the tag bending and cutting mechanism.

43. In a machine of the class described, the combination with an anvil, of means for supplying tags thereto, a movable support slidable with relation to said anvil, a clamping device movable toward and away from the anvil and adapted to clamp a tag to an article, printing mechanism comprising a plurality of printing wheels rotatably mounted in said support, type carried by the wheels and bearing characters to compose a mark, means movable for adjusting the printing wheels whereby predetermined type thereon will be brought into alinement with each other prior to the marking of the tag, means working across the path of movement of the last-named means for limiting the throw of the same whereby the type wheels can be quickly and accurately adjusted, the said clamping device having a jaw provided with a passage for the printing type adjusted for marking the tag and also provided with pockets on opposite sides of said passage for receiving the type adjacent to those projected through the passage to avoid the contact of the last-named type with the tag.

44. In a machine of the class described, the combination with an anvil, a movable support slidable with relation to said anvil, printing mechanism comprising a plurality of printing wheels rotatably mounted in said support, type carried by the wheels and bearing characters to compose a mark, said printing wheels being sleeved upon each other whereby they will fit closely together, cogged wheels being connected with each of the sleeves of each of said printing wheels, cogged segment connected with a second series of sleeves mounted in the movable support and engageable with the cogged wheels, a set of levers connected with the said series of sleeves carrying the segments and being movable in a plane parallel to that of the printing wheels, a set of keys positioned along the plane of movement of the said levers and movable in a plane at right angles to the plane of the levers for controlling the same when it is desired to aline the type of the printing wheels for marking, means for bringing the said keys to normal position out of the path of said levers, and means for locking the levers when set in a desired position.

45. In a machine of the class described, the combination with an anvil, a movable support slidable with relation to said anvil, printing mechanism comprising a plurality of printing wheels rotatably mounted in said support, type carried by the wheels and bearing characters to compose a mark, said printing wheels being sleeved upon each other whereby they will fit closely together, cogged wheels being connected with each of the sleeves of each of said printing wheels, cogged segments connected with a second series of sleeves mounted in the movable support and engageable with the cogged wheels, a set of levers connected with the said series of sleeves carrying the segment and being movable in a plane parallel to that of the printing wheels, a set of keys positioned along the plane of movement of the said levers and movable in a plane at right angles to the plane of the levers for controlling the same when it is desired to aline the type of the printing wheels for marking, means for bringing the said keys to normal position out of the path of said levers, means for locking the levers when set in a desired position, and an inking pad hinged to bear against the type of the printing wheels when in normal position and means for moving the same out of the path of the wheels when moved into printing position toward the anvil.

46. In a machine of the class described, the combination with an anvil, a movable support slidable with relation to said anvil, printing mechanism comprising a plurality of printing wheels rotatably mounted in said support, type carried by the wheels and bearing characters to compose a mark, said printing wheels being sleeved upon each other whereby they will fit closely together, cogged wheels being connected with each of the sleeves of each of said printing wheels, cogged segment connected with a second series of sleeves mounted in the movable support and engageable with the cogged wheels, a set of levers connected with the said series of sleeves carrying the segment and being movable in a plane parallel to that of the printing wheels, a set of keys positioned along the plane of movement of the said levers and movable in a plane at right angles to the plane of the levers for controlling the same when it is desired to aline the type of the printing wheels for marking, means for bringing the said keys to normal position out of the path of said levers, means for locking the levers when set in a desired position, an inking pad hinged to bear against the type of the printing wheels when in normal position and means for moving the same out of the path of the wheels when moved into printing position toward the anvil, and means for bringing the printing mechanism in contact with the anvil.

47. In a machine of the class described, the combination with an anvil, a movable support slidable with relation to said anvil, printing mechanism comprising a plurality of printing wheels rotatably mounted in said support, type carried by the wheels and bearing characters to compose a mark, said printing wheels being sleeved upon each other whereby they will fit closely together, cogged wheels being connected with each of the sleeves of each of said printing wheels, cogged segments connected with a second series of sleeves mounted in the movable support and engageable with the cogged wheels, a set of levers connected with the said series of sleeves carrying the segment and being movable in a plane parallel to that of the printing wheels, a set of keys positioned along the plane of movement of the said levers and movable in a plane at right angles to the plane of the levers for controlling the same when it is desired to aline the type of the printing wheels for marking, means for bringing the said keys to normal position out of the path of said levers, means for locking the levers when set in a desired position, an inking pad hinged to bear against the type of the printing wheels when in normal position and means for moving the same out of the path of the wheels when moved into printing position toward the anvil, means for bringing the printing mechanism in contact with the anvil, and means for comprising a spring for returning the printing mechanism to normal non-printing position.

48. The combination with tagging mechanism of an anvil, a movable support slidable with relation to said anvil, printing mechanism comprising a plurality of printing wheels rotatably mounted in said support, type carried by the wheels and bearing characters to compose a mark, said printing wheels being sleeved upon each other whereby they will fit closely together, cogged wheels being connected with each of the sleeves of each of said printing wheels, cogged segment connected with a second series of sleeves mounted in the movable support and engageable with the cogged wheels, a set of levers connected with the said series of sleeves carrying the segment and being movable in a plane parallel to that of the printing wheels, a set of keys positioned along the plane of movement of the said levers and movable in a plane at right angles to the plane of the levers for controlling the same when it is desired to aline the type of the printing wheels for marking, means for bringing the said keys to normal position out of the path of said levers, means for locking the levers when set in a desired position, an inking pad hinged to bear against the type of the printing wheels when in normal position and means for moving the same out of the path of the wheels when moved into printing position toward the anvil, means for bringing the printing mechanism in contact with the anvil, and means for comprising a spring for returning the printing mechanism to normal non-printing position.

In testimony whereof I affix my signature in presence of two witnesses.

CLAUDE R. DODGE.

Witnesses:
 BYRON L. McKEE,
 WILLIAM J. FOULE.